United States Patent
Wikeley et al.

(10) Patent No.: US 10,973,231 B2
(45) Date of Patent: Apr. 13, 2021

(54) WATER-DISPERSIBLE PLANT GROWTH REGULATING CONCENTRATE AND PROCESSES FOR MAKING AND USING SAME

(71) Applicant: Fine Agrochemicals LTD., Worcestor (GB)

(72) Inventors: Phil Wikeley, Worcestershire (GB); Kevin Forney, Bakersfield, CA (US); Joelle Reignard, Meyzieu (FR); Richard Clapperton, Southampton (GB)

(73) Assignee: Fine Agrochemicals Limited Company, Worcestor (GB)

( * ) Notice: Subject to any disclaimer, the term of this patent is extended or adjusted under 35 U.S.C. 154(b) by 0 days.

(21) Appl. No.: 14/564,772

(22) Filed: Dec. 9, 2014

(65) Prior Publication Data
US 2015/0189885 A1 Jul. 9, 2015

Related U.S. Application Data

(60) Provisional application No. 61/914,588, filed on Dec. 11, 2013.

(51) Int. Cl.
| | | |
|---|---|---|
| *A01N 43/90* | (2006.01) | |
| *A01N 43/80* | (2006.01) | |
| *A01N 25/04* | (2006.01) | |
| *A01N 25/30* | (2006.01) | |
| *A01N 25/14* | (2006.01) | |
| *C05G 3/00* | (2020.01) | |

(52) U.S. Cl.
CPC ............ *A01N 43/90* (2013.01); *A01N 25/04* (2013.01); *A01N 25/14* (2013.01); *A01N 25/30* (2013.01); *A01N 43/80* (2013.01); *C05G 3/00* (2013.01); *A01N 2300/00* (2013.01)

(58) Field of Classification Search
CPC ........ A01N 43/90; A01N 25/04; A01N 43/80; A01N 25/30; A01N 25/14; A01N 2300/00; C05G 3/00
USPC ......................................................... 504/136
See application file for complete search history.

(56) References Cited

U.S. PATENT DOCUMENTS

| | | | |
|---|---|---|---|
| 4,581,056 A * | 4/1986 | Nooden .................. | C05F 11/10 504/136 |
| 4,936,901 A | 6/1990 | Surgant, Sr. et al. | |
| 5,622,658 A | 4/1997 | Lloyd et al. | |
| 6,984,609 B2 | 1/2006 | Devisetty et al. | |
| 2010/0190806 A1 | 7/2010 | Spichal et al. | |
| 2010/0216641 A1 | 8/2010 | Wang et al. | |
| 2010/0234436 A1 | 9/2010 | Dairiki et al. | |
| 2011/0111957 A1 * | 5/2011 | Ishaque .................. | A01N 25/22 504/103 |
| 2013/0053244 A1 | 2/2013 | Devisetty et al. | |

FOREIGN PATENT DOCUMENTS

| | | |
|---|---|---|
| CN | 102239869 A | 11/2011 |
| CN | 103125513 A | 6/2013 |
| CN | 103385248 A | 11/2013 |
| CN | 103563986 A | 2/2014 |
| EP | 0 252 897 A2 | 1/1988 |
| EP | 0 976 329 A1 | 2/2000 |
| JP | 2012522833 | 9/2012 |
| WO | 2008/019063 A2 | 2/2008 |
| WO | 2008032671 | 3/2008 |
| WO | 2010116260 | 10/2010 |

OTHER PUBLICATIONS

Casanova, E. Levels and immunolocalization of endogenous cytokinins in thidiazuron-induced shoot organogenesis in carnation, 2004, J. Plant Physiol., vol. 161, Issue 1, pp. 95-104.*
Danso, K.E., Effect of 6-Benzylaminopurine and alpha-Naphthalene Acetic Acid on In vitro Production of MD2 Pineapple Planting Material, 2008, World Applied Sciences Journal, vol. 3, Issue 4, pp. 614-619.*
Acticide MV. Technical Datasheet [online]. SpecialChem; Thor, 2017 [retrieved on Apr. 6, 2018]. Retrieved from the Internet<URL: https://coatings.specialchem.com/product/a-thor-acticide-mv, 2 pages. (Year: 2017).*
Acticide MV 14 Information Sheet, 2011, Thor, 7 pages. (Year: 2011).*
International Search Report and Written Opinion of the International Searching Authority dated Feb. 19, 2015 for PCT Patent Application No. PCT/US2014/069313, 11 pages.
Schmulling, T., "Cytokonin", Encyclopedia of Biological Chemistry, Academic Press/Elsevier Science, 2004 (7 pages).
Office Action issued in Japanese Application No. JP2016-539095, dated Apr. 24, 2017, 8 pages.

* cited by examiner

Primary Examiner — John Pak
Assistant Examiner — Andriae M Holt
(74) *Attorney, Agent, or Firm* — Kilpatrick Townsend & Stockton LLP

(57) ABSTRACT

Water-dispersible plant growth regulating compositions in concentrated suspended particle form, and more particularly to growth regulating compositions comprising a cytokinin, a surfactant, an anti-foam agent, a buffering system, an anti-freeze agent, and an anti-settling system, dispersed in water.

17 Claims, No Drawings

WATER-DISPERSIBLE PLANT GROWTH REGULATING CONCENTRATE AND PROCESSES FOR MAKING AND USING SAME

CROSS-REFERENCE TO RELATED APPLICATION

This application claims priority to U.S. Provisional Application No. 61/914,588, filed on Dec. 11, 2013, the entirety of which is incorporated herein by reference.

FIELD OF THE INVENTION

The present invention relates generally to water-dispersible plant growth regulating compositions in concentrated suspended particle form, and more particularly to growth regulating compositions comprising a cytokinin, a surfactant, an anti-foam agent, a buffering system, an anti-freeze agent, and an anti-settling system, dispersed in water.

BACKGROUND OF THE INVENTION

Plant growth regulators such as cytokinins are useful for influencing a range of plant developmental processes including branch and floral initiation stem elongation, germination, dormancy, flowering, sex expression, enzyme induction, fruit size and quality, as well as leaf and fruit senescence. Cytokinins are a class of plant growth substances (phytohormones) that promote cell division, or cytokinesis, in plant roots and shoots.

Preparations based on cytokinins, such as 6-furfurylamino purine (kinetin) and 6-benzylaminopurine (6-BAP), are known to be growth stimulators. While the mechanism by which cytokinins affect the growth cycle of plants is far from being understood, it is apparent that they affect leaf growth and prevent aging in certain plants. Although the action of cytokinins on the growth of cultivated plants has been extensively studied, these plant hormones did not find wide application in plant raising since they must be applied at specific concentrations in parts per million. These critical rates of application render cytokinins-based preparations impractical in an agricultural environment. In addition, cytokinins have a low solubility in water or solvent.

6-BAP is a cytokinin used primarily as a chemical thinner in apple/pear production and also to increase branching/flowering in certain ornamental flower species. Current products on the market are formulated as soluble concentrate (SL) formulations. However, these formulations are limited in that they are either solvent-based with a limited active ingredient concentration (typically 2 wt. % 6-BAP) due to limited solubility of 6-BAP or they utilize strong bases such as KOH to get up to approximately 10 wt. % 6-BAP concentration, and the resulting solutions have corrosive properties, greater risk to the end user as well as potential environmental or ecotoxicological issues. In addition, on dilution into spray tanks, the products are prone to crystallization at high use rates due to the limited solubility of the 6-BAP active component. The crystal growth formation can occur due to Ostwald ripening (mediated by temperature fluctuations). This crystallization makes the active component in a form unavailable to the plant, thereby reducing performance, and increasing potential to block spray nozzles.

Some plant growth regulators may be prepared as water-dispersible granules. To prepare the water-dispersible granules for spray application, they are dispersed in water and form a suspension upon agitation. Different water-dispersible granular formulations are known for agricultural chemicals. For example, EP 0 252 897 and U.S. Pat. No. 4,936,901 disclose encapsulated plant growth regulators in water dispersible granular formulations; and U.S. Pat. No. 5,622,658 discloses an extrudable composition for preparing water-dispersible granules. U.S. Pat. No. 6,984,609 discloses a water-soluble granular composition including at least 40% of at least one gibberellin as plant growth regulator, at least one binder, at least one disaccharide and at least one surfactant.

Water-dispersible granules usually have no greater than 8% water content, and form suspensions when added to aqueous solutions. The resulting suspension must be agitated for a period of time in order to fully disperse the active phase particles. Agitation or by-pass recirculation of the tank-mix must also be maintained during application. The quality of water-dispersible granules is highly process- and active-ingredient-dependent and can result in low yield recoveries, poor attrition resistance leading to dust potential, high manufacturing cost and poor dispersability. Generally, sprays of dissolved water-dispersible granular formulations leave undesirable insoluble residues on the treated foliage and fruit.

For plant growth regulators such as gibberellins and cytokinins to be efficacious, the active ingredient must solubilize in the tank-mixes prior to application. Otherwise, product efficacy will be severely affected. When water-dispersible granules are used, the grower often may not be able to realize if he had achieved the total solubility of the active ingredient in the spray solutions. In addition, water-dispersible granules can become hardened over time resulting in poor dispersibility and solubility of the active ingredient. In addition, dust and caking may be problems with certain water-dispersible granules and powder formulations.

The need exists for a cytokinin formulation with high potency and concentrated levels of cytokinin without the use of strong, corrosive bases and without the tendency to crystallize to avoid the problems associated with conventional formulations.

SUMMARY OF THE INVENTION

The present invention relates to water-dispersible suspension concentrates containing a cytokinin such as 6-benzylaminopurine (6-BAP) or 6-furfurylamino purine (kinetin). The concentrates are readily dispersible in water and are efficacious upon being dispersed for plant treatment. In one embodiment, for example, the invention relates to a water-dispersible suspension concentrate of at least one cytokinin, in an amount from 0.1 to 80 wt. %, a surfactant, an anti-foam agent, a buffering system, an anti-freeze agent, and an anti-settling system, dispersed in water. The suspension can have an average dispersed particle size from 1-5 μm. The suspension can also include a biocide, such as an isothiazolin-3-one derivative, antioxidants, and/or adjuvants. The suspension can have a specific pH, such as from 6-8.

In other embodiments, the present invention involves a plant treatment composition comprising the water-dispersible suspension concentrate described above and additional water, wherein the at least one cytokinin is present in the plant treatment composition after dilution in an amount from 10 to 6000 wppm, e.g. from 50 to 1000 wppm, 100 to 1000 wppm (parts per million based on weight), etc. The plant treatment can be applied to plants, fruits, and/or flowers in a process for treating plant materials.

In further embodiments, the invention relates to a process for forming a water-dispersible suspension concentrate comprising milling cytokinin in the presence of a surfactant, anti-foaming agent, and water in a colloid mill to an average particle size from 1 to 5 µm to form a millbase; and blending carrier particles having an average particle size from 1-5 µm, a buffering system, and an antifreeze agent with the millbase to form the suspension concentrate.

DETAILED DESCRIPTION OF THE INVENTION

The present invention relates generally to concentrated water-dispersible plant growth regulating compositions comprising particles suspended in water, and more particularly to growth regulating compositions comprising a cytokinin, a surfactant, an anti-foam agent, a buffering system, an anti-freeze agent, and an anti-settling system, dispersed in water.

The present invention overcomes the issues of the prior art by utilizing a concentrated aqueous formulation in combination with an additive package effective for suspending active material particles in water. The solid active material, preferably a cytokinin such as 6-BAP or kinetin, is milled into micron sized particles using, for example, a colloid mill in water in the presence of a surfactant. The active material can also be milled separately with water and surfactant added later. The average size of the particles is preferably in the range from about 1 to about 5 µm in diameter; for example from about 3 to about 5 µm; from about 1 to about 3 µm, from about 1 to about 2 µm, or about 5 µm; about 3 µm, or about 1 µm, as determined by, for example, laser diffraction (Malvern Mastersizer).

Either before or after milling, clays, gums and/or gels in the form of an anti-settling system can be added to the aqueous suspension to ensure that the active particles are shelf-stable and do not readily settle out. Embodiments of the present invention include concentrated formulations capable of dilution prior to application. Beneficially, the product can stay in the same controlled particle size form on dilution without exhibiting crystallization. Other benefits include that the product contains a relatively small amount of solvent (as an anti-freeze) compared with current commercial products and has a relatively neutral pH. Also, the active material concentration in the composition according to the present invention may advantageously range from about 0.1% to as high as about 80% by weight of the concentrated formulation. Upon dilution prior to application, the active material will be present in a much smaller amount based on the total weight of the diluted composition. For example, the active material in the diluted composition can be present in an amount from 10 to 6000 weight parts per million (wppm) based on the total weight of the diluted composition, e.g., from 50 to 5000 wppm, from 50 to 1000 wppm, from 100 to 1000 wppm, or from 100 to 500 wppm.

Compositions of the present invention can also contain an anti-foam agent to assist with deaeration of the formulations after mixing and milling. Compositions of the present invention can also contain a buffering system to stabilize the pH of the formulations and improve microbial control. Compositions of the present invention can also contain an anti-freeze agent to prevent the formulations from freezing at the storage and use temperatures. The compositions can also further comprise at least one biocide to help control bacteria/yeast growth.

The compositions of the present invention can have a stability of at least two years, as measured by chemical assay using HPLC. For example, the active ingredient concentration for the compositions may remain within at least 10 wt. % of their original value after two years, e.g., within at least 5 wt. %, within at least 3 wt. %, within at least 2 wt. %, or within at least 1 wt. %, as measured by chemical assay using HPLC. Or the active ingredient concentrations for the compositions may remain within at least 10 wt. % of their original value after two weeks at 54° C., e.g., within at least 5 wt. %, within at least 3 wt. %, within at least 2 wt. %, or within at least 1 wt. %, as measured by chemical assay using HPLC. They also have good dispersibility in various aqueous formulations.

Cytokinins

The active medium comprises one or more cytokinins, which is a class of plant growth substances (phytohormones) that promote cell division, or cytokinesis, in plant roots and shoots. There are two basic types of cytokinins: adenine-type cytokinins represented by kinetin, zeatin, and 6-benzylaminopurine (also referred to as BA, BAP, 6-BAP, or 6-benzyladenine), and phenylurea-type cytokinins like diphenylurea and thidiazuron (TDZ). In preferred embodiments the cytokinin is selected from the group consisting of kinetin (synthetic or derived from seaweed), 6-BAP, 1-(2-chloropyridin-4-yl)-3-phenylurea (CPPU), and TDZ. In more preferred embodiments, adenine-type cytokinins are preferred. In even more preferred embodiments, 6-BAP and kinetin are preferred. In the most preferred embodiment, 6-BAP is preferred.

Kinetin was the first of the active cytokinins (having growth promoting properties) identified and is a 6-furfurylaminopurine having the formula:

Other naturally occurring cytokinins include dimethlallyl amino purine:

methylamino purine:

and zeatin (methylhydroxymethylallylaminopurine):

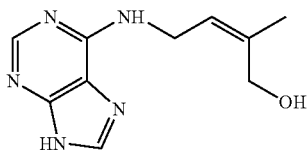 [SMILES: C/C(=C/CNc1ncnc2[nH]cnc12)CO]

Zeatin has been isolated and chemically identified from young kernals of maize, coconut milk, plums, fungus, bacterium, lupin plants and other plants having soluble ribonucleic acid.

Other suitable aminopurines include compounds with—attached to the amino group—phenyl, benzyl, n-ethyl, n-propyl, n-butyl and similar groups.

Diphenylurea, a synthetic compound, shown below, also exhibits cytokinin activity.

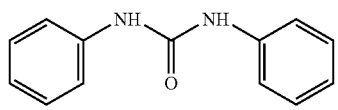 [SMILES: O=C(Nc1ccccc1)Nc1ccccc1]

Another naturally occurring cytokinin is 6-benzylaminopurine (benzyladenine or BAP), which has the structure:

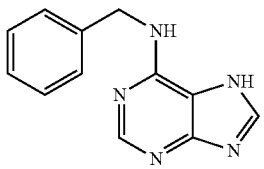 [SMILES: c1ccc(CNc2ncnc3nc[nH]c23)cc1]

6-BAP is a preferred cytokinin and is a plant growth regulator used on certain fruit and white pine trees, calla lily tubers, and spinach grown for seed. It is a naturally occurring cytokinin that elicits plant growth and development responses, setting blossoms and stimulating fruit richness by stimulating cell division. It is an inhibitor of respiratory kinase in plants, and increases post-harvest life of green vegetables. It also enhances the size and shape of fruit, lateral bud break and lateral shoot growth, leading to improved branching in fruit trees and fuller white pine trees. It causes an increase in the number of calla lily flowers while decreasing time lag between first and second flowering. It also causes uniform bolting and increased seed production in spinach.

Various cytokinins are found in different sources. Dimethylallylaminopurine occurs in soluble ribonucleic acid of many different organisms and is produced by bacterium corynebacterium fascians. The bacterium and mutations from dimethylallylaminopurine invade green plants such as algae, chlorella, kelp and by secreting the compound produces cytokinin effects.

The dihydro-derivative of zeatin has been isolated from lupin plants and cytokinins have been isolated from the sporophyte of mosses.

The richest natural sources for cytokinins that have been isolated are seaweed, fruits, and endosperm tissues.

Diphenylurea in the presence of casein hydrolysate is distinctively active in cytokinin effects.

Cytokinins are strong promoters of bud growth and leaf growth stimulation. Some other effects of cytokinins in plants result in ending dormancy, promoting polarity of growth, promoting flowering, increasing effectiveness of light in germination, and promoting stem elongation.

Advantageously, as a result of the present invention, cytokinins can be used in higher concentrations than previously. The amounts of cytokinin used in the concentrate formulations of the present invention can range from about 0.1% to about 80% by weight of the formulation, e.g., from 1 to 50 wt. %, from 2 to 15 wt. %, from 3 to 15 wt. %, from 4 to 15 wt. %, from 5 to 20 wt. %, from 25 to 70 wt. %, from 10 to 25 wt. %, or from 0.1 to 10 wt. %, for example. 6-BAP preferably is used in a concentration of about 2 wt % or more, preferably about 3 wt % or more, up to about 50 wt. %, preferably up to about 25 wt. %.

Surfactants

One or more surfactants can be employed in the formulation as a wetting agent, as well as an anti-freeze and/or as a dispersing and granulating aid. Suitable surfactants include non-ionic surfactants, anionic surfactants and amphoteric surfactants. Non-ionic surfactants may include ethoxylated sorbitan esters such as EMSORB, TWEEN, and T-MAZE; sorbitan fatty acid esters such as SPAN and ALKAMUL; sucrose and glucose esters and derivatives thereof such as MAZON, RHEOZAN and GLUCOPON; ethoxylated alcohols such as TRYCOL, BRIJ, ARMIX and PLURAFAC; ethoxylated alkylphenols such as IGEPAL, MACOL and TERGITOL; ethoxylated fatty amines such as TRYMEEN and ETHOMEEN; ethoxylated fatty acids such as EMEREST, ALKAMUL and TRYDET; ethoxylated fatty esters and oils such as ALKAMUL and ATLAS G; fatty acids such as ATLAS G-1556; glycerol esters such as MAZOL GMO; glycol esters such as GLYCOL SEG; lanolin-based derivatives such as AMERCHOL CAB; methyl esters such as OLEOCAL ME; monoglycerides and derivatives such as ETHOSPERSE G-26; propoxylated and ethoxylated fatty acids such as ANTAROX AA-60; block copolymers of ethylene oxide (EO) and propylene oxide (PO) such as PLURONIC or SURFONIC; polyalkylene oxide block copolymers such as ATLAS G-5000 and ATLAS G-5002L; silicone-based surfactants such as SILWET, BREAKTHRU and mixtures of organosilicon surfactant with non-ionic or ionic surfactants; polysaccharides, copolymers of acrylamide and acrylic acid; and acetylenic diol derivatives such as SURFYNOL 104 or tristyrylphenols such as SOPROPHOR and ethoyxlated polyarylphenols such as SOP ROPHOR BSU, among others. Ethoxylated sorbitan esters may also be employed as surfactant. Non-ionic surfactants such as polyoxyethylene (20) monolaurate (TWEEN 20 or POLYSORBATE 20) may also be used.

Suitable anionic surfactants include phosphate esters such as EMPHOS and RHODAFAC; sulfates and sulfonates of oils and fatty acids such as POLYSTEP; sulfates and sulfonates of ethoxylated alkylphenols such as TRITON X-301; sulfates of dodecyl and tridecylbenzenes such as CALMULSE; sulfonates of condensed naphthalenes such as VULTAMOL; sulfonates of naphthalene and alkyl naphthalene and condensates thereof such as MORWET and sulfosuccinates and derivatives such as MONAWET, among others.

Suitable amphoteric surfactants include lecithin and lecithin derivatives; and imidazolines and imidazoline derivatives such as MIRANOL, among others. The trade names used above for binders and surfactants often are common to a class or series of binders or surfactants. Therefore, where a trade name is mentioned, any binder or surfactant in the family including that trade name will be suitable.

Preferred surfactants include surfactants selected from the group consisting of (alkyl)naphthalene sulphonates (and condensates thereof), oxoalcohol PO-EO adducts (polypropylene oxide—ethylene oxide block copolymers), polyalkylene oxide block copolymers, ethoyxlated polyarylphenols, and salts and mixtures thereof.

The amount of surfactant employed in the compositions of the invention may vary depending largely on the type of surfactant, carrier medium and specific active media employed. In preferred embodiments, the concentrate composition comprises the surfactant in an amount from 0.1 to 20 wt. %, e.g., from 0.1 to 5 wt. %, or from 0.5 to 2 wt. %, based on the total weight of the composition.

Anti-Settling System/Thickeners

An anti-settling system in the form of swellable clays, gels, and/or gums can be added to formulations of the present invention to help prevent the active particles from settling out of solution. An example is sodium montmorillonite. These swellable clay particles consist of very thin plates and can produce a "gel" in the continuous phase by a mechanism known as a "House-of-Card" structure. The plates have negative surfaces and positive edges and they produce the "House-of-Card" structure by edge-to-face association. Another example of a thickener or stabilizer is Xanthan gum, a polysaccharide secreted by the bacterium Xanthomonas campestris. It is often used as a food thickening agent (in salad dressings, for example). Fumed silica, such as Aerosil 200, can also be used. Preferred anti-settling systems include clay thickeners, xanthan gum thickeners, and combinations thereof. Preferred clay thickeners include those of the BENTOPHARM family. Preferred xanthan gum thickeners include those of the RHODOPOL family, for example RHODOPOL 23. The anti-settling system/thickeners can be used in the concentrated formulations of the present invention in an amount from 0.5 to 20 wt. %, e.g., from 1 to 10 wt. %, from 1 to 5 wt. %, from 2 to 4 wt. %.

Anti-freeze Agent

The optional inclusion of at least one anti-freezing agent can help prevent the formulations from freezing at the storage and use temperatures for the formulations. Any known anti-freezing agents can be used. For example, glycols can be used as anti-freezing agents in formulations of the present invention. In some embodiments, the surfactant/dispersant can also serve as an anti-freezing agent. The anti-freezing agent can be selected for having low toxicity. Preferred anti-freezing agents for use with formulations of the present invention include glycerol and propylene glycol. The concentration of the anti-freezing agent in the formulation can vary depending on the amounts of other components, the intended use conditions, and the market region, but generally is in the range of 1-30% by weight, e.g., between 5-15% by weight, based on the weight of the concentrated formulation.

Buffer System

The suspension concentrate optionally includes a buffering system to stabilize the pH of the formulations and improve microbial control. Any compatible weak acid or weak base that can maintain the pH of the formulation can be used. Buffering systems can be used to give a fairly neutral buffer, such as in the pH range from 5 to 9, e.g., from 6 to 8 or about 7. Preferred buffering systems comprise phosphate buffers. More preferred buffering systems comprise mono or dibasic potassium phosphate or combinations thereof.

Anti-foaming Agent

The suspension concentrate preferably further comprises an anti-foaming agent or agents to help reduce persistent foam and in particular, reduce air entrainment during production. This, in turn, can help improve dispersion in the formulations. Any anti-foaming agent compatible with the formulations of the present invention that remains dispersed when added can be used, such as, for example, silicone-based anti-foams. Other examples of potential anti-foaming agents include oil based defoamers, powder defoamers on a particulate carrier such as silica, water based defoamers, EO/PO based defoamers, alkyl polyacrylates, and mixtures thereof. Specific product trade names include GLADIATOR, BREAK-THRU, DE-FOAM, and FOAM STOP, as examples. One preferred anti-foaming agent is SAG 1572, a silicon anti-foam emulsion, sold by MOMENTIVE. Another is SILCOLAPSE 426R sold by BLUESTAR SILICONES. Addition levels of the anti-foaming agent can vary, depending on the amounts of other components and the agitation of the formulations, but generally are in the range of 0.1-1.0 wt. %; e.g., 0.1 to 0.5 wt. %, 0.1-0.2 wt. %, based on the total weight of the suspension concentrate.

Biocide

At least one biocide can optionally be included in formulations of the present invention. Use of an appropriate biocide can help control bacteria/yeast growth. Preferred biocides include isothiazolin-3-one derivatives. Isothiazolinones are antimicrobials used to control bacteria, fungi, and algae in cooling water systems, fuel storage tanks, pulp and paper mill water systems, oil extraction systems, wood preservation and antifouling agents. For example, Methylisothiazolinone, Chloromethylisothiazolinone, Benzisothiazolinone, Octylisothiazolinone, and/or Dichlorooctylisothiazolinone and combinations thereof, may be included in formulations of the present invention. Examples of preferred biocides include PROXEL GXL, ACTIDE MBS, and ACTICIDE MV (mixture of 5-chloro-2methyl-4-isothiazolin-3-one (1.11%) and 2-methyl-4-isothiazolin-3-one (0.37%)). The biocide can be present in the suspension concentrates of the present invention in an amount ranging from 0.05 to 5 wt. %, e.g., 0.1 to 1 wt. %, 0.1 to 0.5 wt. %, based on the total weight of the suspension concentrate.

Optional Supplemental Active Ingredients

It is also contemplated that the materials of this invention may be used in combination with other essential biologicals or beneficial microorganisms or active ingredients, such as herbicides, insecticides, nematicides, biological pesticides such as microbial pesticides, biochemical pesticides (semiochemicals, hormones or natural plant regulators), plant produced pesticides (botanicals) or plant nutrients. One example includes auxins, such as 1-naphthaleneacetic acid, including its sodium salt (NaNAA).

Optional Adjuvants

Other components of the formulation may include additional surface active agents, stickers, spreader stickers, preservatives, humectants, dyes, U.V. (ultra-violet) protectants, acidifiers, compatibility agents, flow agents, antioxidants, petroleum-based oils, vegetable-based oils, or other components that facilitate product handling and application. The optional adjuvants may be applied, for example, in an amount ranging from 0.1 to 1.0% v/v, e.g., from 0.125 to 0.5% v/v.

Method of Making Particles and Formulations

The suspension particles employed in the suspension concentrates of the present invention may be formed by a variety of processes, such as colloid milling, agglomeration granulation, pan granulation, or spray drying. In a preferred embodiment, the suspension particles are formed using colloid milling. For example, a grind mixture can be prepared comprising active ingredient particles along with surfactant and water. The grind mixture can also include any of the following: anti-freeze(s), anti-foam(s), additional surfactant(s), additional active material(s), biocide(s), and thickener. The grind mixture can be mixed at high shear before colloid milling. In addition to the grind mixture, a thickener mixture is also formed comprising an anti-settling system and/or one or more thickening agents. The thickening mixture can contain, in addition to water and anti-settling system/thickening agent, anti-freeze(s), anti-foam(s), surfactant(s), the active material(s), and biocide(s). After milling of the grind mixture, the thickener mixture and grind mixture are combined to form a blended mixture.

In other embodiments, the cytokinin may be separately passed through a mill, e.g., an air, jet, or hammer mill, to reduce its particle size before adding to surfactant and water. In this embodiment, the cytokinin is dry milled alone. Surfactant and water are added later. In some embodiments, the cytokinin can be dry milled before being added to a grind mixture.

After milling, the grind mixture may be combined with water and/or a thickener mix and blended, e.g., in a powder blender, to form a blended mixture. Water is then preferably added to the blended mixture in an amount sufficient to form the suspension concentrate, while preferably mixing continuously. Water is typically added in an amount from 10 to 95 wt. % based on the total weight of the concentrated formulation, e.g., from 15 to 90 wt. % or from 20 to 85 wt. %, although the amount may vary depending on scale and equipment. Any or all of these materials can also be added separately after the thickening mixture is added to the milled grind mixture.

Application

The precise amount of plant-growth-regulating composition employed in treating plants or seeds will depend largely upon the type of response desired, the formulation used and the type of plant species or seed treated. For example, water may be added to the suspension concentrates of the invention in an amount sufficient to provide a cytokinin concentration from 5 to 6000 wppm, e.g., from 50 to 5000 wppm, from 50 to 1000 wppm, from 100 to 1000 wppm, or from 100 to 500 wppm, of the diluted formulation. The composition can also be agitated or stirred before or after (or both before and after) dilution, though in some embodiments the composition is not agitated or stirred. The diluted formulations can be applied by any conventional means. When applied in-furrow (foliar application), the composition may be applied in an amount sufficient to provide a concentrated composition from 1.0 L to 10.0 L per hectare. For in-furrow/foliar applications, typical spray volumes may range from 500 to 3000 L per hectare.

The following examples are illustrative of the wide range of plant growth responses that can be realized by application of a preferred composition of the present invention to various plant species. Nevertheless, there is no intention that the invention be limited to these optimum ratios of active components since those skilled in the art will find the compositions of the invention set forth hereinabove to be effective growth enhancers. Also, the recognition of improved results using the compositions according to the present invention in connection with other plants, seeds, fruits and vegetables not specifically illustrated herein is readily within the capabilities of one skilled in the art. The person skilled in the art will recognize that where the formulation comprises a number of different components, preferred ranges which are taught above for the different components are envisioned to be combined in the preferred embodiments of the present invention.

In a preferred embodiment, for example, the invention relates to a water-dispersible suspension concentrate of at least one cytokinin, in an amount from 3 to 30 wt. %, a surfactant in an amount of from 0.1 to 5 wt. %, an anti-foam agent in an amount of 0.1 to 0.5 wt. %, a buffering system such that the suspension has a specific pH from 6-8, an anti-freeze agent in an amount in the range of 1-30% wt. %, and an anti-settling system in an amount of from 1 to 10 wt. %, dispersed in water. The suspension has an average dispersed particle size from 1-5 μm, and can also include a biocide, such as an isothiazolin-3-one derivative, antioxidants, and/or adjuvants.

EXAMPLES

Cytokinin suspension concentrates were prepared and analyzed. First, a thickening mixture comprising 15 wt. % Pluronic PE 10400 (surfactant) solution was prepared by melting the surfactant at 60° C. then adding to water at the same temperature. Approximately 1 kg of a grind mixture was then prepared with the composition and addition order given in Table 1. Bentopharm support particles (anti-settling particles) were included in the grind mixture to reduce the rate at which the 6-BAP settled. Without the support particles, obvious settling occurred within seconds; but with the support particles, settling was reduced and the mixture exhibited slow sedimentation over a period of a few minutes. A high level of antifoam, water and Morwet IP were included in the grind mixture in an attempt to improve wetting of the solids and to reduce air entrainment.

TABLE 1

| Grind Mixture Components (In order of addition) | % w/w |
|---|---|
| Water (diluent) | 43.43 |
| SAG 1572 (antifoam) | 0.60 |
| 15% Pluronic PE10400 (dispersant) | 9.91 |
| Morwet IP (dispersant/wetting agent) | 2.50 |
| Morwet D809 (dispersant/wetting agent) | 7.43 |
| 6-benzyladenine (99.1%) active ingredient | 30.00 |
| Acticide MBS (biocide) | 3.08 |
| Acticide MV (biocide) | 1.55 |
| Bentopharm (anti-settling agent) | 1.50 |

The grind mixture was high shear mixed in a Silverson blender at 6000 rpm to homogenize prior to milling. Milling was then carried out in an Eiger mill using 0.75-1 mm beads at 4000 rpm, with the mill being cooled by water from a chiller, which maintained the grind mixture at 20° C. It was immediately noticed that the inclusion of the Morwet IP surfactant and antifoam greatly reduced air entrainment in the grind mixture at the milling stage. However, at this solids loading, the grind mixture was highly viscous. Nevertheless, the grind mixture was sufficiently pumpable and after milling 25 minutes the following particle size distribution was obtained using a Malvern laser diffractometer.

TABLE 2

| Particle Size Distribution | d (50) | d (90) |
|---|---|---|
| Target | <3 microns | <10 microns |
| Actual | 2.0 microns | 5.0 microns |

To complete the formulation, a thickener mix was prepared as follows:

TABLE 3

| Thickener Mixture Components (In order of addition) | % w/w |
|---|---|
| Water (diluent) | 91.39 |
| Rhodopol 23 (gum anti-settling agent) | 0.325 |
| Bentopharm (anti-settling agent) | 3.02 |
| Propylene glycol (anti-freezing agent) | 5.21 |
| SAG 1572 (anti-foam agent) | 0.062 |
| Morwet IP (dispersant/wetting agent) | 0.364 |
| Dibasic potassium phosphate (buffering agent) | 0.161 |
| Monobasic potassium phosphate (buffering agent) | 0.215 |

Half of the thickening mixture was modified by addition of a further 0.4% w/w of Acticide MBS. The suspension concentrate was prepared by mixing 6.53% w/w of the grind mixture with 93.47% w/w of the thickener mixture. The final composition of the formulation tested in this study was as given in Table 4 below:

TABLE 4

| Formulation Component | % w/w | g/L |
|---|---|---|
| 6-BAP (99.1%) (active ingredient) | 1.96 | 20.28 |
| Morwet D809 (dispersant/wetting agent) | 0.49 | 5.08 |
| Pluronic PE10400 (dispersant) | 0.097 | 1.00 |
| SAG 1572 (anti-foam agent) | 0.097 | 1.00 |
| Propylene glycol (anti-freeze agent) | 4.86 | 50.29 |
| Bentopharm (anti-settling agent) | 2.90 | 30.01 |
| Rhodopol 23 (gum anti-settling agent) | 0.30 | 3.10 |
| Morwet IP (dispersant/wetting agent) | 0.50 | 5.17 |
| Dibasic potassium phosphate (buffering agent) | 0.15 | 1.55 |
| Monobasic potassium phosphate (buffering agent) | 0.20 | 2.07 |
| Acticide MBS (biocide) | 0.20 | 2.08 |
| Acticide MV (biocide) | 0.10 | 1.03 |
| Water (diluent) | 88.15 | 916.76 |

Appearance

The formulation was a pale grey, pourable opaque liquid. The visual stability of the formulation was monitored over 2 weeks. There was no change in color.

TABLE 5

| Storage Conditions | wt. % supernatant | wt. % sediment |
|---|---|---|
| 2 weeks @ 54° C. | 3.0 | 0 |

Particle Size Distribution

Measurements were made using a Malvern laser diffractometer, employing the Fraunhofer model and diluting in saturated 6-BAP solution.

TABLE 6

| Sample | d(90) microns | d(50) microns | d(10) microns |
|---|---|---|---|
| Initial | 9.6 | 2.6 | 1.0 |
| 2 weeks @ 54° C. | 9.6 | 2.7 | 1.1 |

Biological Performance

The biological performance of the formulations of the present invention have been shown to be at least equal to those of conventional formulations, and without the solubility/crystallization problems or corrosive issues discussed previously, and with the ability to utilize cytokinin levels of up to 80 wt. % in the concentrated formulation. For example, in both apple trials and ornamental flower trials, formulations prepared according to the present invention performed as well as conventional solvent based commercial formulations.

Cactus Studies

Specifically, in a study regarding cactus plants under greenhouse conditions, the formulation in Table 7 was applied to the cactus as an embodiment of the present invention:

TABLE 7

| Component | % w/w | g/L |
|---|---|---|
| 6-benzyladenine (99.1%) | 1.95 | 20.18 |
| Morwet D809 | 0.5 | 5.18 |
| Pluronic PE10400 | 0.1 | 1.04 |
| SAG 1572 | 0.1 | 1.04 |
| Propylene glycol | 4.85 | 50.20 |
| Bentopharm | 2.9 | 30.02 |
| Rhodopol23 | 0.325 | 3.36 |
| Morwet IP | 0.5 | 5.18 |
| Dibasic potassium phosphate | 0.15 | 1.55 |
| Monobasic potassium phosphate | 0.20 | 2.07 |
| Acticide MBS | 0.60 | 6.21 |
| Acticide MV | 0.10 | 1.03 |
| Water | 87.725 | 907.95 |

In a repeated study (Study #1 and #2), 3 diluted concentrations of these formulations were applied to cactus at the pinpoint bud stage: Example 1=5 mL of concentrated formulation per L of water; Example 2=10 mL of concentrated formulation per L of water; Example 3=20 mL of concentrated formulation per L of water. For comparison, a commercially available solvent-based 6-benzyladenine formulation, EXILIS from Fine Agrochemicals Limited was also applied. That is, 3 diluted concentrations of the commercial EXILIS solvent-based formulation (2% w/w BAP soluble concentrate) were applied to cactus: Example 4=5 mL of EXILIS per L of water; Example 5=10 mL of concentrated formulation per L of water; Example 6=20 mL of concentrated formulation per L of water. In addition, in Example 7 a control cactus was left untreated.

The cactus was Schlumbergera Britta variety in Study #1 and Schlumbergera Dark Eva variety in Study #2. The cactus crops were six week cuttings, repotted at week 26. The cactus were in 11 cm deep containers in potting soil with a weekly watering of a height of 4 mm of water.

The lay-out was 28 plots with a net plot size of 10 plants per plot in randomized blocks.

The stage of application was at the pinpoint bud stage with a crop height of 22 cm. The formulations were applied using an AZO sprayer with a Whirl 160 nozzle at a pressure of 3.5 bar on the spray tank and a travel speed of 1 m/s. The crops were grown according to Good Agricultural Practice (GAP).

At the point of harvest, either after 45 days (Study #1) or 38 days (Study #2), the number of flowers and flower buds per cactus plant were counted and tabulated (10 plants per plot). The averaged results are reported in Table 8.

TABLE 8

Cactus Study-Number of Flowers Per Plant

| Ex. | Treatment | Number of Flowers per Plant (Ave. of 2 trials) |
|---|---|---|
| 1 | (5 mL/ha) | 54.6 |
| 2 | (10 mL/ha) | 65.2 |
| 3 | (20 mL/ha) | 89.3 |
| 4 | Exilis (5 mL/ha) | 53.3 |
| 5 | Exilis (10 mL/ha) | 65.3 |
| 6 | Exilis (20 mL/ha) | 88.1 |
| 7 | Untreated | 35.3 |

As is evident from Table 8, the formulations according to the present invention gave similar numbers of flowers per cactus plant as the commercial solvent-based formulation at corresponding dilution levels, and both were significantly higher than the untreated plants. Examples 1-3 all had an average flower production rate of more than 40 flowers per plant.

Phalaenopsis Study

Another application trial involved phalaenopsis under greenhouse conditions. The formulation in Table 7 was applied to phalaenopsis in 2 doses: Example 8=5 mL of concentrated formulation per L of water; Example 9=5 mL of concentrated formulation per L of water plus Li700 (surfactant). For comparison, similar levels of commercially available solvent-based 6-benzyladenine formulations were applied to phalaenopsis: Example 10: 5 mL of EXILIS per L of water; Example 11: 5 mL of EXILIS per L of water plus Li700 (surfactant). In addition, in Example 12, a phalaenopsis was left untreated.

The crops were Phalaenopsis of Bayamo variety. The crops were planted at a rate of 50 plants per m². The orchids were in 12 cm deep containers in potting soil with watering every 4 days from overhead irrigation according to need.

The lay-out was 40 plots with a net plot size of 10 plants per plot in randomized blocks.

The treatments were applied 1 week after the start of cold induction with a crop height of 22 cm. The formulations were applied using an AZO sprayer with Birchmeier tips and a Whirl 160 nozzle at a pressure of 4.5 bar on the spray tank and a travel speed of 1 m/s. The crops were grown according to Good Agricultural Practice (GAP). 89 days after application of the treatments, the number of stems per plant were counted and tabulated (10 plants per plot). The averaged results are reported in Table 9 below.

TABLE 9

Phalaenopsis Study-Number of Stems per Plant

| Ex. | Treatment | Number of Stems per Plant |
|---|---|---|
| 8 | (5 mL/L) | 3.4 |
| 9 | (5 mL/L) + Li700 (50 mL/L) | 3.4 |
| 10 | Exilis (5 mL/L) | 3.5 |
| 11 | Exilis (5 mL/L) + Li700 (5 mL/L) | 3.6 |
| 12 | Untreated | 2.1 |

Table 9 demonstrates that the formulations according to the present invention gave similar numbers of stems per phalaenopsis plant as commercial solvent-based formulation. Examples 8 and 9 exhibited an average stem production rate of greater than 2.0 stems per plant.

Apple Thinning Study

Another application trial involved apple thinning. The formulation in Table 7 was applied to apple trees of the Royal Gala variety. Treatments were applied using a powered motorized hand gun incorporating a single GG3009 solid cone nozzle. At a pressure of 1500 kPa, treatments were applied in a total volume of 1500 L/ha. A single application was completed when king fruitlet diameter was 8-10 mm. Plot size was a single tree. Assessments were conducted at 43 days after treatment.

The formulations of the present invention were applied in 2 doses: Example 13=3.0 L concentrated formulation per hectacre ("ha"); Example 14=3.5 L concentrated formulation per ha. For comparison, a commercially available solvent-based 6-benzyladenine formulation, EXILIS from Fine Agrochemicals Limited, and a commercially available emulsifiable concentrate 6-benzyladenine formulation utilizing a glycol solvent, MAXCEL from Sumitomo Chemical, were also applied to apple trees. Example 15=7.5 L of EXILIS per ha; Example 16=9.0 L of EXILIS per ha; Example 17=7.5 L of MAXCEL per ha; Example 18=9.0 L of MAXCEL per ha. In addition, Example 19 involved an untreated apple tree as a control. All treatments were applied with KENDEEN 20 surfactant, a non-ionic wetting agent containing 1000 g/L polyoxyethylene sorbitan monolaurate marketed by Kendon Plant Care Pty Ltd. at 125 mL/100 L added.

43 days after treatment, the number of fruit per flower cluster were counted and tabulated. The averaged results are reported in Table 10 below.

TABLE 10

Apple Thinning Study-Number of Fruit per Flower Cluster

| Ex. | Treatment | Mean Number of Fruit per Flower Cluster |
|---|---|---|
| 13 | 3.0 L/ha | 1.8 |
| 14 | 3.5 L/ha | 2.0 |
| 15 | Exilis (7.5 L/ha) | 1.6 |
| 16 | Exilis (9.0 L/ha) | 1.6 |
| 17 | Maxcel (7.5 L/ha) | 1.7 |
| 18 | Maxcel (9.0 L/ha) | 1.7 |
| 19 | Untreated | 2.6 |

Table 10 demonstrates that the formulations according to the present invention gave similar number of apple fruit per flower cluster as the commercial solvent-based and emulsifiable concentrate formulations. Thus, the formulations according to the present invention provide a similar level of efficacy as the commercial formulations and also give the benefits discussed, as well as a lower cost when formulated at higher strength.

Examples 20-24

Additional cytokinin suspension concentrates were prepared and analyzed. The preparation process for the grind mixtures (or millbase) was as follows. Water, dispersant, antifoam and biocides were added to a suitable vessel and mixed for 5 minutes until homogenous with a Silverson mixer fitted with a large round hole head. BAP technical was slowly added and mixed for 30 minutes until homogenous with a Silverton mixer fitted with a large round hole head. The slurry was mixed for a further 10 minutes with a Silverton mixer fitted with a small round hold head to ensure D(90) particle size of less than 300 μm. The mixture was then bead milled with a Eiger Mini Motor mill at 80% charge and 0.75-1.0 mm glass beads for 30 minutes at 4000 rpm with a target particle size distribution of D(50)<2.5 μm D(90)<7.5 μm.

To complete the formulations, thickener mixtures were prepared as follows. Water, polypropylene glycol, and antifoam were added to a suitable vessel and mixed for 5 minutes until homogenous with a Silverson mixer fitted with a large round hole head. pH buffers were added and mixed until dissolved. If included in the formulation, NaNAA (sodium naphthalene-acetic acid) was added and mixed until dissolved. Anti-settling agents and dispersant/wetting agents were added and mixed for 10 minutes until homogenous with a Silverson mixer fitted with a large hole head.

Finished product batches were then prepared by adding the grind mixture and thickener to a suitable vessel and mixed for 15 minutes until homogenous with a Silverson mixer fitted with a large round hole head.

Examples 20-24 were prepared to illustrate different aspects of the invention. Examples 20 and 21 utilized different dispersants. Example 22 used an increased active ingredient concentration. Example 23 used a different active ingredient. Example 24 used dual active ingredients. Appearance, density, active content, and pH were measured. The compositions and analyses are shown below. The composition of the grind mixtures are shown in Table 11. The compositions of the thickener mixtures are shown in Table 12. The final compositions are shown in Table 13.

TABLE 11

Grind Mixtures (Millbases)

| Grind Mixture Components (% w/w) | Ex. 20 | Ex. 21 | Ex. 22 | Ex. 24 | Ex. 25 |
| --- | --- | --- | --- | --- | --- |
| 6-BAP (99.0%) (active ingredient) | 25.000 | 25.000 | 55.000 | — | 25.00 |
| Kinetin (100%) (active —) | — | — | — | 24.780 | — |
| NaNAA (active —) | — | — | — | — | — |
| Soprophor BSU (dispersant) | 2.882 | — | — | — | — |
| Atlas G5002L (dispersant) | — | 2.882 | — | — | — |
| Morwet D809 (dispersant) | — | 1.239 | 1.306 | 6.41 | — |
| Morwet IP (dispersant/wetting agent) | 1.283 | 1.283 | 1.283 | 1.306 | 1.67 |
| Bentopharm (anti-settling agent) | 1.500 | 1.500 | 1.500 | 1.500 | 1.50 |
| Silcolapse 426R (anti-foam) | 0.200 | 0.200 | 0.200 | 0.200 | — |
| SAG 1572 (anti-foam) | — | — | — | — | 0.40 |
| 15% Pluronic PE10400 (dispersant) | 0.000 | 0.000 | 1.652 | 1.734 | 8.54 |
| Acticide MBS (biocide) | 0.250 | 0.250 | 0.250 | 0.250 | 2.05 |
| Acticide MV (biocide) | 0.248 | 0.248 | 0.248 | — | 1.23 |
| Deionized Water (diluent) | 68.637 | 68.637 | 38.628 | 68.928 | 53.20 |

TABLE 12

Thickeners

| Thickener Mixture Components (% w/w) | Ex. 20 | Ex. 21 | Ex. 22 | Ex. 24 | Ex. 25 |
| --- | --- | --- | --- | --- | --- |
| Deionized Water (diluent) | 88.008 | 88.008 | 88.008 | 88.097 | 88.040 |
| Rhodopol 23 (gum anti-settling agent) | 0.308 | 0.308 | 0.308 | 0.305 | 0.353 |
| Bentopharm (anti-settling agent) | 2.567 | 2.567 | 2.567 | 2.548 | 3.017 |
| Propylene glycol (anti-freezing agent) | 7.688 | 7.688 | 7.688 | 7.638 | 5.260 |
| Silcolapse 426R (anti-foam) | 0.040 | 0.040 | 0.040 | 0.037 | — |
| SAG 1572 (anti-foam agent) | — | — | — | — | 0.074 |
| Morwet IP (dispersant/wetting agent) | 0.015 | 0.015 | 0.015 | 0.241 | 0.402 |
| Dibasic potassium phosphate (buffering agent) | 0.238 | 0.238 | 0.238 | 0.322 | 0.162 |
| Monobasic potassium phosphate (buffering agent) | 0.318 | 0.318 | 0.318 | 0.812 | 0.217 |
| NaNAA | — | — | — | — | 2.093 |
| Acticide MBS | 0.818 | 0.818 | 0.818 | 0.153 | 0.477 |

TABLE 13

Final Formulations

| Formulation Component (g/L) | Ex. 20 | Ex. 21 | Ex. 22 | Ex. 24 | Ex. 25 |
| --- | --- | --- | --- | --- | --- |
| 6-BAP (99.0%) (active ingredient) | 100.32 | 99.98 | 505.05 | — | 20.52 |
| Kinetin (100%) (active ingredient) | — | — | — | 100.00 | — |
| NaNAA (active ingredient) | — | — | — | — | 20.13 |
| Soprophor BSU (dispersant) | 11.29 | — | — | — | — |
| Atlas G5002L (dispersant) | — | 11.74 | — | — | — |
| Morwet D809 (dispersant/wetting agent) | — | — | 11.63 | 5.27 | 5.25 |
| Pluronic PE10400 (dispersant) | — | — | 2.05 | 1.05 | 1.04 |
| SAG 1572 (anti-foam agent) | — | — | — | — | 1.06 |
| Silcolapse 426R (anti-foam) | 1.04 | 1.04 | 1.05 | 1.05 | — |
| Propylene glycol (anti-freeze agent) | 50.41 | 50.24 | 50.06 | 50.06 | 49.99 |
| Bentopharm (anti-settling agent) | 22.64 | 22.73 | 3.48 | 22.75 | 30.06 |
| Rhodopol 23 (gum anti-settling agent) | 2.03 | 2.03 | 2.00 | 2.00 | 3.43 |

TABLE 13-continued

Final Formulations

| Formulation Component (g/L) | Ex. 20 | Ex. 21 | Ex. 22 | Ex. 24 | Ex. 25 |
|---|---|---|---|---|---|
| Acticide MBS (biocide) | 6.41 | 6.39 | 6.33 | 6.33 | 5.87 |
| Acticide MV (biocide) | 1.04 | 1.04 | 1.00 | 1.00 | 0.99 |
| Morwet IP (dispersant/wetting agent) | 5.23 | 5.22 | 5.27 | 5.27 | 5.19 |
| Dibasic potassium phosphate (buffering agent) | 1.54 | 1.53 | 1.58 | 1.58 | 1.53 |
| Monobasic potassium phosphate (buffering agent) | 2.08 | 2.07 | 2.11 | 2.11 | 2.19 |
| Deionized water (diluent) | 851.83 | 850.36 | 464.90 | 855.53 | 883.96 |

Appearance

The visual appearance of the samples before homogenization was recorded initially and after 2 weeks at both 0° C. and 54° C. All samples appeared as white, free flowing homogenous liquids in all cases, except after two (2) weeks at 54° C., Example 22 exhibited a minor amount of yellow, clear supernatant. However, all samples were fully homogenized after storage within 10 inversions or less with no color change from the initial.

Density

The density of the prepared samples measured using CIPAC MT 3 is shown in Table 14.

TABLE 14

| | Density | | | | |
|---|---|---|---|---|---|
| Density (g/mL) | Ex. 20 | Ex. 21 | Ex. 22 | Ex. 24 | Ex. 25 |
| Initial | 1.048 | 1.053 | 1.090 | 1.050 | 1.051 |

Active Ingredient Content

The active ingredient content of the samples measured initially and after 2 weeks at 54° C. is shown in Table 15.

TABLE 15

| | Active Ingredient Content | | | | |
|---|---|---|---|---|---|
| Active content | Ex. 20 | Ex. 21 | Ex. 22 | Ex. 24 | Ex. 25 |
| Initial | 98.8 g/L (BAP) | 99.5 g/L (BAP) | 482 g/L (BAP) | 96.6 g/L (Kinetin) | 19.4 g/L (BAP) & 20.4 g/L NaNAA |
| After 2 weeks at 54° C. | 102.8 g/L (BAP) | 98.7 g/L (BAP) | 486 g/L (BAP) | 95.9 g/L (Kinetin) | 20.3 g/L & (BAP) 20.4 g/L NaNAA |

The active ingredient content remained fairly stable for all samples.

pH Determination

The pH of the samples measured initially and after 2 weeks at 54° C. according to CIPAC MT 75.3 in 1% deionized water is shown in Table 16.

TABLE 16

| | pH | | | | |
|---|---|---|---|---|---|
| pH | Ex. 20 | Ex. 21 | Ex. 22 | Ex. 24 | Ex. 25 |
| Initial | 7.2 | 7.2 | 7.3 | 7.3 | 7.3 |
| After 2 weeks at 54° C. | 7.2 | 7.3 | 7.2 | 7.2 | 7.1 |

The pH remained fairly stable for all samples.

Other physical and chemical properties such as wet sieve residue, spontaneity, suspensibility, high shear rheology, and particle size (using laser analysis) were measured using CIPAC methods and found to be acceptable both initially and after two weeks of storage at 54° C.

While the invention has been described in detail, modifications within the spirit and scope of the invention will be readily apparent to those of skill in the art. It should be understood that aspects of the invention and portions of various embodiments and various features recited above and/or in the appended claims may be combined or interchanged either in whole or in part. In the foregoing descriptions of the various embodiments, those embodiments which refer to another embodiment may be appropriately combined with other embodiments as will be appreciated by one of ordinary skill in the art. Furthermore, those of ordinary skill in the art will appreciate that the foregoing description is by way of example only, and is not intended to limit the invention.

We claim:

1. A water-dispersible suspension concentrate, comprising: a least one naturally occurring cytokinin in an amount from 10 to 25% wt. %, a surfactant, an anti-foam agent, a buffering system, an anti-freeze agent, a biocide, and an anti-settling system dispersed in water, the suspension having an average dispersed particle size from 1-5 µm; and wherein the concentrate has a pH from 6-8,
wherein the at least one cytokinin is selected from the group consisting of 6-benzyladenine and kinetin
wherein the surfactant is selected from the group consisting of (alkyl)naphthalene sulphonates and condensates thereof and propylene oxide-ethylene oxide block copolymers, and mixtures thereof; and
wherein the anti-freeze is selected from the group consisting of glycols;
and the anti-settling system is comprised of materials selected from the group consisting of clays, gums, and mixtures, thereof.

2. The concentrate of claim 1, wherein the biocide is selected from the group of isothiazolin-3-one derivatives.

3. The concentrate of claim 1, wherein the at least one cytokinin is 6-benzyladenine.

4. The concentrate of claim 1, further comprising 1-naphthaleneacetic acid or its salt.

5. The concentrate of claim 1, further comprising at least one antioxidant.

6. The concentration of claim 1, further comprising at least one adjuvant.

7. The concentrate of claim 1, having a stability of at least 2 years as measured by chemical assay using HPLC.

8. The concentrate of claim 1, wherein the buffering system comprises a phosphate buffer.

9. The concentrate of claim 1, comprising a combination of biocides.

10. The concentrate of claim 9, wherein the combination of biocides comprises a mixture of 5-chloro-2-methyl-4-isothiazolin-3-one and 2-methyl-4-isothiazolin-3-one.

11. The concentrate of claim 10, wherein the buffering system comprises a phosphate buffer.

12. A water-dispersible suspension concentrate, comprising: a least one naturally occurring cytokinin in an amount from 25-70 wt. %, a surfactant, an anti-foam agent, a buffering system, an anti-freeze agent, a biocide, and an anti-settling system dispersed in water, the suspension having an average dispersed particle size from 1-5 µm; and wherein the concentrate has a pH from 6-8,
   wherein the at least one cytokinin is selected from the group consisting of 6-benzyladenine and kinetin
   wherein the surfactant is selected from the group consisting of (alkyl)naphthalene sulphonates and condensates thereof and propylene oxide-ethylene oxide block copolymers, and mixtures thereof; and
   wherein the anti-freeze is selected from the group consisting of glycols;
   and the anti-settling system is comprised of materials selected from the group consisting of clays, gums, and mixtures, thereof.

13. A plant treatment composition comprising the water-dispersible suspension concentrate of claim 1 and additional water, wherein the at least one cytokinin is present in the plant treatment composition after dilution in an amount from 10 to 6000 ppm.

14. The plant treatment composition of claim 13, wherein the composition maintains an average dispersed particle size less than 5 µm for at least 18 hours.

15. A process for treating a plant comprising:
   applying the plant treatment composition of claim 13 to the plant.

16. The process of claim 15, wherein the plant treatment composition yields an increased flower production rate at the point of harvest compared with an untreated plant.

17. The process of claim 15, wherein the plant treatment composition yields an increased average stem, branch, or offset production rate compared with an untreated plant.

* * * * *